H. McQUINIFF.
CORN-PLANTER.
No. 188,024. Patented March 6, 1877.
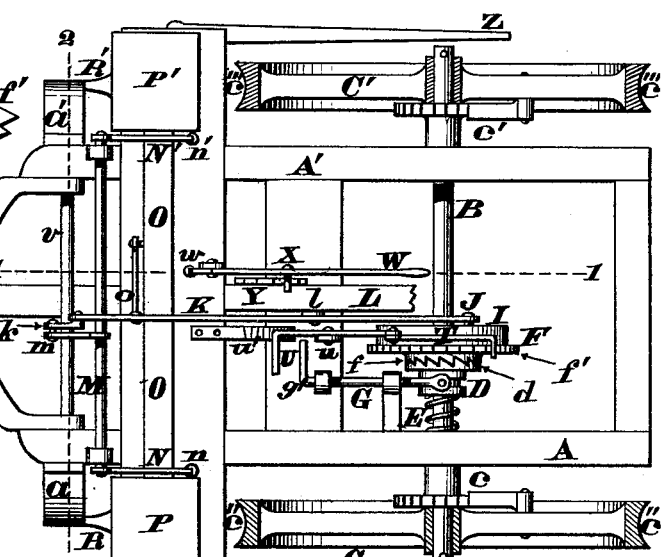

UNITED STATES PATENT OFFICE.

HENRY McQUINIFF, OF FRANKFORT, OHIO.

IMPROVEMENT IN CORN-PLANTERS.

Specification forming part of Letters Patent No. 188,024, dated March 6, 1877; application filed October 28, 1876.

*To all whom it may concern:*

Be it known that I, HENRY MCQUINIFF, of Frankfort, Ross county, Ohio, have invented certain new and useful Improvements in Corn-Planters, of which the following is a specification:

This invention relates to that class of agricultural implements which are capable of being employed either for drilling or for planting grain in check-rows; and the first part of my improvements consists in a novel combination of devices whereby the change from a planter to a drill, or vice versa, may be effected in a few minutes, and without detaching any of the principal operative parts of the machine. To accomplish this result I apply a two-part cam-plate to the driving-axle of the implement, which plate is provided with a groove that receives a pin or roller on the rear end of a lever that reciprocates the seed-slide, said groove being concentric with the driving-axle. This concentric groove has one, two, or more eccentric curves in it, and as soon as the revolution of said plate brings the pin or roller in contact with such eccentric portions the rear end of the lever is at once depressed, thereby elevating its front end, so as to operate the seed-slide. Each implement is provided with a number of such plates, say from three to five of them, and as each plate is made in two parts they can be readily mounted upon the driving-axle by simply bolting or otherwise securing the two halves to a ratchet-wheel, which latter is driven by a clutch-coupling from said axle. When it is desired to employ the machine for planting, a cam-plate is employed which has but one or two eccentric portions in it, so as to produce only one or two strokes of the seed-slide at every revolution of the ground-wheels. For drilling purposes there is fitted to the implement a cam-plate, having quite a number of eccentric grooves in it, say from six to ten or more, so as to effect a very rapid reciprocation of the slide, and thereby discharge the grain continuously into the furrows plowed out by the two opposite shares of the machine.

The second part of my invention relates to a combination of devices whereby the driver of the implement is enabled to operate the seed-slide independently of the actuating appliances previously described. This result is accomplished by the provision of a treadle, whose rear end carries a feed hand or pawl, that engages with the ratchet-wheel to which the divided cam-plate is secured; and if at any time the machine should lose ground, so as to throw the rows out of line, the driver can operate the treadle very rapidly, thus rotating the aforesaid ratchet-wheel, and causing the seed-slide to act when the shares are exactly in line with the grain deposited in the previously-covered furrows. By this arrangement any lost motion of the machine is instantly and accurately compensated for; but it is evident the implement must be provided with some appliances to obviate irregularities resulting from a too rapid rotation of the ground-wheels in certain parts of the field, as such rapid rotation would cause the planter to gain ground, and thereby throw the rows out of line. This difficulty is readily obviated by simply shifting the clutch that communicates motion from the driving-axle to the ratchet-wheel, which disengagement of the operating devices arrests the action of the seed-slide for a sufficient length of time to compensate for the ground gained by the machine. Said clutch is readily shifted by a treadle convenient to the driver, and as soon as it is desired to again throw the seed-slide into action, the driver lifts his foot from said treadle, and a suitable spring then throws the clutch into gear with the ratchet-wheel.

The third part of my invention consists in operating two indicators or markers by the same vibrating lever that imparts the reciprocating motion to the seed-slide. These indicators have a vertically-reciprocating motion, and when depressed they make two very perceptible indentations or marks in the ground, thereby designating the exact places where the grain has been dropped into the two parallel furrows. By this means the driver is guided in planting the two subsequent rows, it being understood that the implement furrows out, plants, and covers two rows every time it is driven across the field.

Having thus indicated the leading features of the implement, I will now give a detailed description of the same, and also explain more fully the manner of operating the machine.

In the annexed drawings, Figure 1 is a plan of my improved corn-planter, the ground-wheels thereof being shown in section, and the pole of the implement broken off. Fig. 2 is a longitudinal section of the same, taken at the line 1 1 of Fig. 1, the indicators being shown in their depressed position. Fig. 3 is a transverse section at the line 2 2 of Fig. 1, the indicators being represented elevated. Fig. 4 is a vertical section of the cam-plate, ratchet-wheel, and clutch-coupling, the latter being disengaged from the ratchet-wheel. Fig. 5 represents more clearly the devices employed for imparting an independent rotation of the ratchet-wheel. Fig. 6 is a perspective view, showing one of the detachable points removed from its share; and Fig. 7 represents a modified form of the cam-plate detached from the driving-axle. Diagram 8 represents one-half of a two-part cam-plate.

Secured to the under surfaces of side beams A A' are suitable boxes, which afford journal-bearings for the rotating axle B, the latter being driven by ratchet-connections $c$ $c'$ of ground-wheels C C', which connections, being the same as generally employed with harvesters, &c., need no further description. The peripheries of these ground-wheels are concaved at $c''$ and $c'''$, respectively, so as to act as coverers for the furrows made by the shares R R'. The rotating axle B is provided with a feather or rib, $b$, as seen in Fig. 4, which feather compels the clutch D to rotate in unison with said axle. Interposed between this clutch and beam A is a spiral spring, E, whose stress has a constant tendency to force said clutch along axle B toward the center of the machine, and thereby maintain the radial teeth $d$ of the device D in gear with the teeth $f$ of a wheel or disk, F, whose periphery is armed with a ratchet, $f'$. This clutch is disengaged from said ratchet-wheel F $f f'$ by means of an arm, $g$, depending from the rear end of rock-shaft G, whose front end is furnished with a treadle, $g'$, convenient to the driver's feet. The aforesaid ratchet-wheel is capable of rotating freely upon driving-axle B, and its inner face has secured to it, with bolts H or otherwise, a cam-plate, I, having a groove, $i$, concentric with axle B, and a groove, $i^1$, eccentric to said axle. This cam-plate may be a single casting, as seen in Fig. 4, and be provided with but one eccentric groove; or said plate may be made in two parts, as represented in Figs. 2 and 7. In the former of these illustrations the cam-plate is represented as composed of two precisely similar parts, I and I$^1$, whose grooves $i$ unite with each other, so as to afford a continuous concentric groove. These two plates are each furnished with a single eccentric groove, $i^1$, located diametrically opposite each other.

As represented in Fig. 7, the two-part cam-plate is furnished with four eccentric grooves, $i^2$, $i^3$, $i^4$, and $i^5$, while in diagram 8 five such grooves are shown in one-half of a cam-plate. $b''$ are pins or stops which prevent the ratchet-wheel F and its attached cam-plate or plates being shifted longitudinally of the driving-axle B. Fitting in the grooves $i$ $i^1$ of the cam-plate is a stud, J, and, if preferred, said stud may have a roller, J$^1$, journaled upon it, as seen in Fig. 4. This stud projects laterally from the rear end of a vertically vibrating or oscillating lever, K, pivoted at $l$ to the beam L, that supports the driver's seat $l^1$.

Attached to the front end of this lever is a link, $k$, connecting with an arm, $m$, of rock-shaft M, which latter is disposed transversely of the implement. This shaft M has secured to its opposite ends arms N and N', to which are coupled the vertically-reciprocating indicators $n$ and $n'$. Furthermore, lever K has attached to it one end of a short rod, $o$, which imparts a reciprocating motion to the seed-slide O, so as to discharge grain from both of the hoppers P and P'. This slide may have any approved form of cut off devices applied to its opposite ends.

The front end of lever K may be confined to a vertical path by any suitable guide. The hoppers P P' are provided, respectively, with grain-spouts Q Q', to whose fronts the shares or furrow-openers R R' are attached, the upper ends of said shares being curved inwardly at $a$ $a'$, and secured to the side beams A A', as seen in Fig. 3. These shares are slotted, respectively, in a vertical direction, as shown at $r$ $r'$, to receive rearwardly-projecting shanks $s$ of detachable points S, which latter may be made of cast-steel or chilled iron, or other hard metal. The upper ends of these detachable points are secured to the shares with lugs $s'$ and bolts or screws $s''$. (See Fig. 2.)

In order that the driver may rotate ratchet-wheel F whenever desired, a feed-hand, T, is provided, whose front end is pivoted to a treadle, U, which latter is pivoted at $u$ to the frame of the implement. Treadle U is maintained in an elevated position by a suitable spring, $u'$. The pole or tongue V is pivoted to the machine by a cross-bar, $v$, and the rear end of said pole has attached to it a rod, $w$, communicating with handle W, convenient to the driver. This handle is provided with a pin, X, capable of engaging with the rack Y.

The object of the devices V $v$, W $w$, and X Y is to regulate the penetration of the shares R R'. Z is a bar which enables the driver guiding his team so as to run the machine parallel with the previously-covered furrows.

To illustrate the operation of my implement I will suppose that it is to be employed for planting corn, and that the axle B carries a two-part cam-plate, I I$^1$, with two eccentric grooves, $i^1$ $i^1$, in it, as seen in Fig. 2. Now, it is evident that when the implement is driven across the field the ground-wheels C C' will rotate axle B through the medium of ratchet-couplings $c$ $c'$, and the feather $b$ of said axle will cause a corresponding revolution of clutch D $d$. The teeth $d$ of this clutch being ratchet-shaped, and being engaged with teeth $f$ of wheel or disk F, a positive rotation of the latter is insured, and consequently the cam-plate I I$^1$ is compelled to rotate in unison with axle B. The lever K remains stationary so long as its stud J occupies either of the concentric grooves $i$ of the aforesaid cam-plates; but the moment said stud enters either of the eccentric grooves $i^1$ the rear end of the lever is depressed accordingly. This act elevates the front end of lever K, thereby shifting slide O toward the hopper P, and discharging corn from both of the hoppers, through their respective tubes or spouts Q Q', into the furrows made by shares R R'. This elevation of the front end of lever K not only shifts the slide so as to drop corn from both hoppers, but such an elevation of the lever causes a simultaneous descent of the two indicators $n$ $n'$, which indicators enter the ground far enough to make a very perceptible depression or pit near the places where the grain has been deposited in the two furrows.

The further rotation of cam-plates I I$^1$ liberates stud J from the eccentric portion $i^1$, and causes said stud entering the concentric groove $i$, thereby elevating the rear end of lever K, and at once restoring the devices N $n$ N' $n'$ O to their original positions, to be again shifted, as previously described, the moment stud J enters the other eccentric groove of the cam-plate, which operations are repeated twice at every complete revolution of the actuating appliances F I I$^1$.

As the machine continues to advance, the concave peripheries $c''$ $c'''$ of the ground-wheels collect the loose earth thrown up by the shares R R' and press the soil back into the furrows, thereby covering the corn in the most expeditious and thorough manner.

If the field is perfectly level and the ground-wheels rotate constantly with a uniform speed, it is apparent all of the subsequent deposits of grain will be in line with those of the two first furrows; but as such conditions do not always prevail, some provision must be made for correcting errors that might otherwise occur in checking off the rows. To illustrate how readily such errors may be corrected with my machine, I will suppose that the wheels C C' have "lost ground," and that the cam-plates I I$^1$ will not operate quick enough to drop the corn in line with the previous deposits, as indicated by the depressions made with markers $n$ $n'$. As soon as this loss of ground is noticed by the driver, he depresses the treadle U a number of times, so as to effect an independent rotation of cam-plates I I$^1$, through the instrumentality of feed device T, acting on the ratchet-periphery $f'$ of wheel F, which independent rotation of said cam-plates, being rapidly accomplished, actuates the seed-slide O at the proper moment, and thereby compensates for the "lost ground." If, on the contrary, it should be found that the driving-wheels C C' have "gained ground," and that the cam-plates I I$^1$ will not act at the proper moment, the driver has only to depress the other treadle $g'$, so as to throw the clutch D $d$ out of gear with ratchet-wheel F, and thereby arrest the rotation of cam-plates I I$^1$ for the time being. The instant said treadle is relieved from the pressure of the driver's foot, spring E causes clutch D to re-engage with wheel F, and the cam-plate I I$^1$ at once resumes its regular operations.

From the above description it will be seen that any gain or loss of ground resulting from the irregular rotation of the driving-wheels C C' can be instantly compensated for by the driver, and without compelling him to dismount, or to use his hands.

If the implement is to be used for planting corn at certain invariable intervals, the cam-plate I I$^1$ may have but a single eccentric groove, $i^1$, in it, and in such cases said plate may be cast in one piece with the ratchet-disk F $f$ $f'$. I prefer, however, making said plate in two pieces, and to bolt or otherwise secure these similar halves to the wheel F, as I am thereby enabled to produce a machine capable of more diversified use.

By securing to wheel F a cam-plate having four eccentric grooves in it, as seen in Fig. 7, the number of vibrations of lever K at every revolution of axle B will be increased accordingly, and four deposits of corn will be made by a single rotation of said cam-plate. This form of plate will, therefore, be employed when it is desired to plant the hills very near together.

By removing the cam-plate shown in Fig. 7 and substituting therefor such a one as represented in diagram 8, the reciprocations of slide O will be so rapid as to produce an almost continuous, if not actually continuous, discharge of grain from the hoppers P and P', thus converting the implement into a drill.

By thus using three or four distinct cam-plates the machine can be readily adapted for any kind of planting or drilling operations, and without being compelled to load the implement with a number of heavy and complicated gear-wheels, wherewith such changes are usually effected.

The manner of attaching the separable points S to the shares R is another advantage peculiar to my machine, as the insertion of the shanks $s$ into the recesses $r$ of the shares effectually prevents any lateral springing or bending of said removable members S.

In case either of the points should break off, or should need sharpening, the bolts $s''$ can be unscrewed, and the points can then be instantly disengaged from the shares.

Instead of link $k$ and rod $o$, a system of gears and racks may be employed for communicating motion from lever K to the shaft M and seed-slide O.

In this specification, wherever the expression "gaining ground" occurs, it is to be understood as referring to such an unusually rapid rotation of wheels C C' as would induce the dropping mechanism to act too soon, and thereby diminish the distance between two contiguous hills in the same row.

The expression "losing ground" is to be understood as referring to the opposite defect—that is to say, an unusually slow rotation of said wheels, whereby the distance between two contiguous hills in the same row would be increased.

I am aware of the fact that it is not new to provide corn-planters with appliances of various kinds to compensate for any gain or loss of ground by the implement, and, therefore, I lay no claim, broadly, to this feature of the machine, but limit myself to such compensating devices when arranged in conjunction with a cam-wheel that rotates freely upon the driving-axle, and operates the seed-slide by means of a vibrating lever or its equivalent.

I claim as my invention—

1. The cam-plate I, adapted to rotate freely upon axle B, and having a concentric groove, $i$, and one or more eccentric grooves, $i^1$, which connected grooves $i$ and $i^1$ are traversed by stud J of vertically-vibrating lever K, said cam-plate I $i$ $i^1$ being applied to a wheel or disk, F $f$ $f'$, which latter is driven from axle B by the clutch $b$ D $d$ E, and is capable of an independent rotation by the feed-hand T, or its equivalent device, substantially as herein described and set forth.

2. In combination with ratchet-wheel F $f$ $f'$, and its attached cam-plate I $i$ $i^1$, and driving-clutch $b$ D $d$ E, the feed-hand T, operated by treadle U, or its equivalent device, for imparting an independent rotation to said wheel and cam-plate, substantially as herein described and set forth.

3. The combination of ratchet-wheel F $f$ $f'$, cam-plate I $i$ $i^1$, driving-clutch $b$ D $d$ E, and the devices T U and G $g$ $g'$, whereby the driver of the implement is enabled to compensate for any loss or gain of ground, substantially as herein described and set forth.

4. The divided two-part cam-plate I I$^1$, having connected concentric grooves $i$, and one or more eccentric grooves, $i^1$, said two-part cam-plate I I$^1$ $i$ $i^1$ being secured to the ratchet-wheel F $f'$ with bolts H, or their equivalents, substantially as herein described and set forth.

5. The detachable point S, secured to share R with lug $s'$ and bolt $s''$, said point being provided with a rearwardly-projecting shank, $s$, that engages with the recess $r$ of the share, substantially as herein described, and for the purpose set forth.

6. In combination with a planter, a freely-rotating cam-plate, mounted upon the driving-axle, and operated by a disk or wheel, so as to reciprocate the seed slide or slides of the implement, said cam-plate being capable of one independent movement to compensate for any gain of ground, and of another independent movement to make up for a loss of ground, arranged and operating substantially as herein described and set forth.

In testimony of which invention I hereunto set my hand.

HENRY McQUINIFF.

Witnesses:
JAMES H. LAYMAN,
L. H. BOND.